(12) United States Patent
Ghannam et al.

(10) Patent No.: US 11,060,339 B2
(45) Date of Patent: Jul. 13, 2021

(54) SYSTEMS AND METHODS FOR MITIGATING LIFTGATE FROM CONTACTING OBJECTS WHILE CLOSING

(71) Applicant: Ford Global Technologies, LLC, Dearborn, MI (US)

(72) Inventors: Mahmoud Yousef Ghannam, Canton, MI (US); Brian Bennie, Sterling Heights, MI (US); Kevin Michael Lysik, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 81 days.

(21) Appl. No.: 15/957,509

(22) Filed: Apr. 19, 2018

(65) Prior Publication Data

US 2019/0323278 A1 Oct. 24, 2019

(51) Int. Cl.
| G06K 9/00 | (2006.01) |
| G06K 9/62 | (2006.01) |
| E05F 15/73 | (2015.01) |
| E05F 15/70 | (2015.01) |
| E05F 15/77 | (2015.01) |
| E05F 15/40 | (2015.01) |
| G06T 7/20 | (2017.01) |
| G08B 21/02 | (2006.01) |
| G07C 9/00 | (2020.01) |

(Continued)

(52) U.S. Cl.
CPC ............ *E05F 15/40* (2015.01); *B60J 5/102* (2013.01); *G06K 9/00362* (2013.01); *G06K 9/00805* (2013.01); *G06T 7/20* (2013.01); *G07C 9/00896* (2013.01); *G07C 9/28* (2020.01); *G07C 9/29* (2020.01); *G08B 21/02* (2013.01); *E05Y 2400/30* (2013.01); *E05Y 2800/254* (2013.01); *E05Y 2900/546* (2013.01); *G06K 2209/21* (2013.01); *G06T 2207/30196* (2013.01); *G07C 2009/00928* (2013.01); *G07C 2009/00984* (2013.01)

(58) Field of Classification Search
None
See application file for complete search history.

(56) References Cited

U.S. PATENT DOCUMENTS

| 7,545,486 B1 * | 6/2009 | Deschutter ............... G01P 3/64 |
| | | 356/28 |
| 9,470,034 B2 | 10/2016 | Ihlenburg et al. |

(Continued)

FOREIGN PATENT DOCUMENTS

| JP | 2009299387 A | 12/2009 |
| WO | WO 2008043931 A1 | 4/2008 |

*Primary Examiner* — Adam D Tissot
*Assistant Examiner* — Laura E Linhardt
(74) *Attorney, Agent, or Firm* — Frank Lollo; Eversheds Sutherland (US) LLP (57) ABSTRACT

A vehicle includes a liftgate system for mitigating a liftgate from contacting an object within a closing path of the liftgate. The liftgate system includes the liftgate, a camera, and a processor. The liftgate includes a surface facing an interior of the vehicle when the liftgate is closed. The camera is disposed on the surface. The processor detects, via the camera, an object within a closing path of the liftgate. The processors estimate a trajectory of the object when the object is in motion. The processor controls the liftgate based on the estimated trajectory and a speed setting at which the liftgate closes.

16 Claims, 6 Drawing Sheets

(51) Int. Cl.
    *B60J 5/10*           (2006.01)
    *G07C 9/28*          (2020.01)
    *G07C 9/29*          (2020.01)

(56) References Cited

U.S. PATENT DOCUMENTS

| | | | |
|---|---|---|---|
| 9,580,046 B2 * | 2/2017 | Luu | B60R 25/2054 |
| 9,689,191 B1 | 6/2017 | Kim | |
| 2002/0109587 A1 * | 8/2002 | Attring | B60R 25/2009 |
| | | | 340/426.1 |
| 2004/0119823 A1 * | 6/2004 | Takagi | H04N 7/181 |
| | | | 348/148 |
| 2009/0000196 A1 | 1/2009 | Kollar et al. | |
| 2011/0295469 A1 * | 12/2011 | Rafii | G06T 7/254 |
| | | | 701/49 |
| 2013/0275008 A1 * | 10/2013 | Breed | E05F 15/77 |
| | | | 701/49 |
| 2016/0059827 A1 | 3/2016 | Uddin et al. | |
| 2016/0274338 A1 | 9/2016 | Davies et al. | |
| 2017/0201687 A1 * | 7/2017 | Edney | H04N 5/23238 |
| 2017/0204651 A1 | 7/2017 | Gussen et al. | |
| 2017/0210342 A1 * | 7/2017 | De Wind | B60Q 1/323 |
| 2017/0241188 A1 | 8/2017 | Kalhous et al. | |
| 2018/0001820 A1 * | 1/2018 | Higgins | B62D 33/0273 |
| 2018/0299900 A1 * | 10/2018 | Bae | G06K 9/00805 |
| 2019/0161012 A1 * | 5/2019 | Kim | H04N 7/181 |

* cited by examiner

SYSTEMS AND METHODS FOR MITIGATING LIFTGATE FROM CONTACTING OBJECTS WHILE CLOSING

TECHNICAL FIELD

The present disclosure generally relates to systems and methods for performing automatic liftgate closing operations, and more specifically, systems and methods for mitigating a liftgate from contacting objects within a closing path of the liftgate.

BACKGROUND

Vehicles include a feature for automatically closing liftgates in response to a user input. In many cases, a user provides the input without realizing that a person or an object is within a closing path of the liftgate. Some vehicles include pressure sensors to prevent liftgates from closing on such objects within the closing path; however, these liftgates must contact the objects to trigger the pressure sensors.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Vehicles and methods are disclosed for automatic liftgate closing operations. An example vehicle includes a liftgate, a camera, and a processor. The liftgate includes a surface facing an interior of the vehicle when the liftgate is closed. The camera is disposed on the surface. The processor detects, via the camera, an object within a closing path of the liftgate. The processors estimate a trajectory of the object when the object is in motion. The processor controls the liftgate based on the estimated trajectory and a speed setting at which the liftgate closes.

An example vehicle includes a liftgate, sensors, and a processor. The liftgate includes a surface facing an interior of the vehicle when the liftgate is closed. The sensors are disposed on the surface. The processor defines, via the sensors, a critical zone at a rear end of the vehicle. The critical zone is stationary while the liftgate is moving. The processor controls the liftgate when the sensors detect a mobile device within the critical zone.

An example method includes initiating, via a processor, a liftgate closing operation, detecting, via a camera, an object within a closing path of a liftgate, responsive to the object being in motion, estimating, via the processor, a trajectory of the object, and controlling, via the processor, the liftgate based on the estimated trajectory and a speed setting at which the liftgate closes.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles include features for automatically closing their liftgates or rear hatch doors. Typically, these vehicles receive instructions to automatically close the liftgates from a mobile device, such as a key fob or a smartphone, or from a human machine interface (HMI) provided in the vehicles. Often times, a person may be loading items into a vehicle or unloading items from a vehicle, and without him/her noticing, the liftgate may be accidentally actuated, causing the liftgate to bump into the person's head or shoulders. In some examples, a child may be entering or exiting a trunk of a vehicle, and the parent may accidentally actuate the liftgate to automatically close while the child is within the closing path of the liftgate. While some vehicles include force sensors to minimize an impact between a person and the closing liftgate, these vehicles do not prevent the liftgate from contacting the person.

As used herein, a "liftgate" refers to a door or panel at a rear of a vehicle that opens upwardly to provide access to a trunk and/or another cargo area or compartment of the vehicle. In some examples, the liftgate includes a hatch that is coupled to a body of the vehicle (e.g., a sports-utility vehicle (SUV), a minivan, a hatchback, etc.) via a hinge located along an upper edge of a cargo area or compartment. In other examples, the liftgate includes a trunk lid that is coupled to a body of the vehicle (e.g., a sedan, a compact car, etc.) via a hinge along an outer edge of a trunk.

As described below, a liftgate system includes a liftgate, a body control module (BCM) and a warning system. The liftgate includes a camera that is attached to an interior surface of the liftgate. The camera is commutatively coupled to the BCM to transmit images captured by the camera. The BCM includes a liftgate controller that analyzes these images. The liftgate controller controls the liftgate based on the analysis and provides instructions to the warning system to generate a warning to a user.

To close the liftgate, an operator activates the liftgate system via a mobile device or an HMI (e.g., on a touch screen of a center console display). When the vehicle receives a command to close the liftgate, the camera detects whether an object is within the closing path of the liftgate. When no object is within the closing path of the liftgate, the liftgate controller closes the liftgate. When an object is within the closing path of the liftgate, the liftgate controller determines whether the object is a person. For example, the liftgate controller may compare images captured by the camera with images stored in memory. For example, the images stored in the memory may be actual images of people or outlines of shapes of people. When the object is a person, the liftgate controller stops closing the liftgate, instructs the warning system to provide a warning to alert the user, and confirms with the user via the mobile device or the HMI whether the user wishes to resume closing the liftgate. When the object is not a person, the liftgate controller further classifies the object as a moving object or a stationary object. When the object is a moving object, the liftgate controller estimates a potential impact between the liftgate and the moving object. When the liftgate controller determines that an impact may occur, the liftgate controller stops the liftgate. When the liftgate determines that an impact would not occur, the liftgate controller causes the liftgate to move. When the object is stationary, the liftgate system pauses the liftgate, the warning system issues a warning to the user, and liftgate system prompts the user, via the mobile device or the HMI, to indicate whether the user wishes to resume closing the liftgate.

Alternatively or additionally, in some examples, the liftgate system determines that the user is within the closing path of the liftgate when a sensor detect that the user's mobile device is within a detection area near the liftgate. In such example, the sensor is attached to the interior surface of the liftgate. The sensor and the a mobile device of the user are paired. The sensor detects the distance of the mobile device from the sensor. When the mobile device is within a threshold distance from the sensor, the liftgate controller stop closing the liftgate. The liftgate controller dynamically changes the threshold distance as the liftgate changes its position. For example, the liftgate controller reduces the threshold distance as the liftgate closes.

In some examples, the liftgate system includes more than one sensor to detect the position of the user's mobile device. In such example, the sensors are disposed on the interior surface of the liftgate. The liftgate system uses the sensors to determine the position of the mobile device (e.g., via triangulation or trilateration). In such example, the sensors determine the proximity of a mobile device relative to the sensors using signal strength measurements (such as a received signal strength indicator (RSSI) or a received signal strength (RX)) from the sensors to estimate a relative distance between the mobile device and the rear end of the vehicle. The liftgate systems defines a critical zone. The critical zone is fixed to a location at the rear end of the vehicle. The liftgate system continues defining the critical zone at the same position relative to the vehicle even when the sensors move along with the liftgate as the liftgate is closing. When the mobile device is within the critical zone, the liftgate system determines that the user is within the path of the closing liftgate and acts as discussed above.

Figure 1:
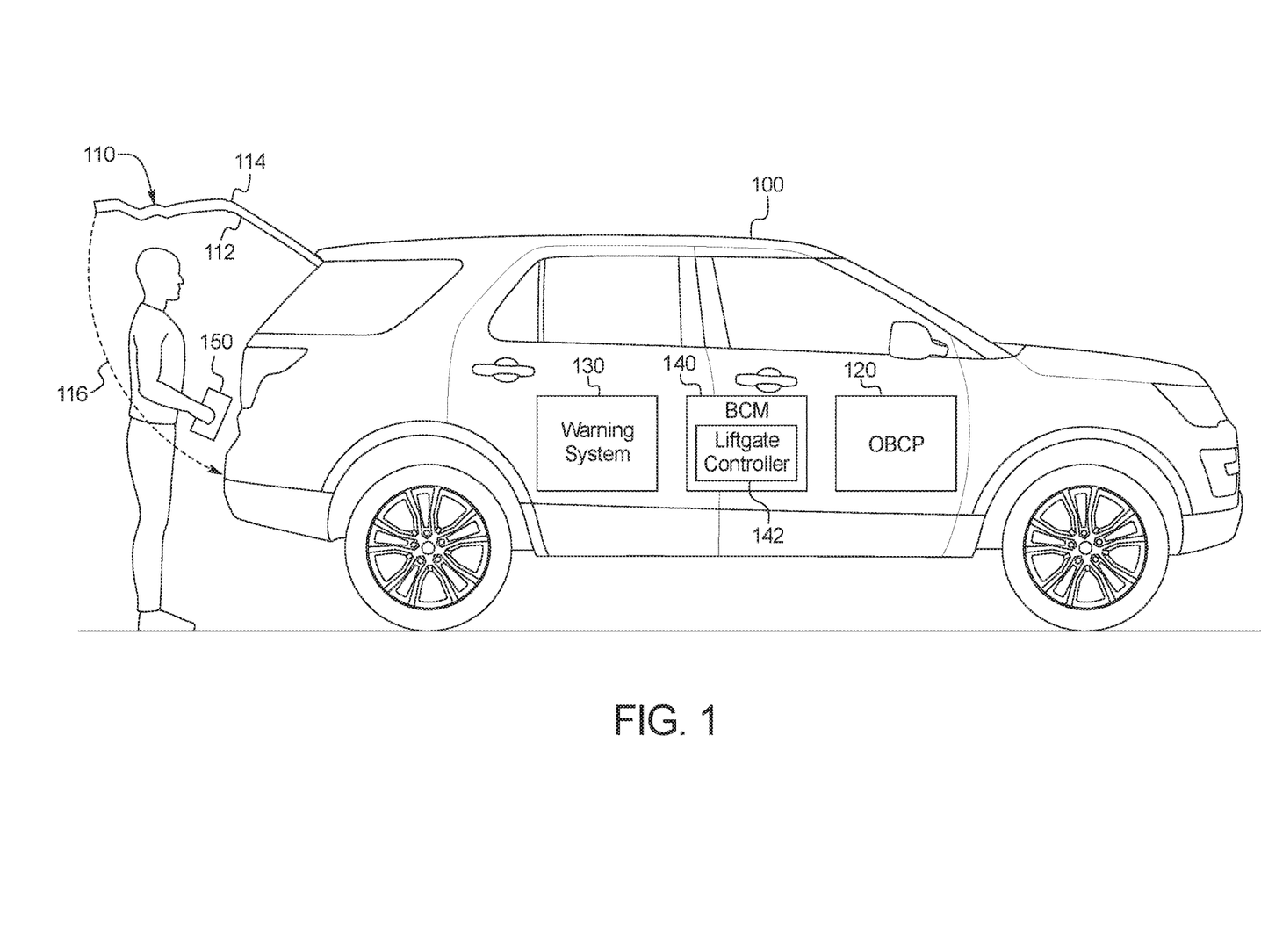
FIG. 1 illustrates a vehicle including a liftgate operating in accordance with the teachings of disclosure.

FIG. 1 illustrates a vehicle 100 in accordance with this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be a semi-autonomous vehicle (e.g., some routine motive functions, such as parking, are controlled by the vehicle 100), or an autonomous vehicle (e.g., motive functions are controlled by the vehicle 100 without direct driver input).

In this illustrated example, the vehicle 100 includes a fifth door (e.g., van or a hatchback). In this illustrative example, the vehicle 100 includes a liftgate 110, an on-board communication platform (OBCP) 120, a warning system 130, and a body control module (BCM) 140.

The liftgate 110 is a door or panel hinged to the upper portion of an entrance to a cargo compartment located at the rear end of the vehicle 100. The liftgate 110 opens upwardly to provide access to a cargo compartment (not shown). The liftgate 110 includes an exterior surface 114 and an interior surface 112. The exterior surface 114 faces the external of the vehicle 100 when the liftgate 110 is closed and the interior surface 112 faces the interior of the vehicle 100 when the liftgate 110 is closed. The liftgate 110 includes a motor, controlled by the BCM 140, that opens and closes the liftgate 110. In some examples, the motor provides speed control that facilitates the BCM 140 controlling a speed at which the liftgate 110 opens and closes.

Figure 2:
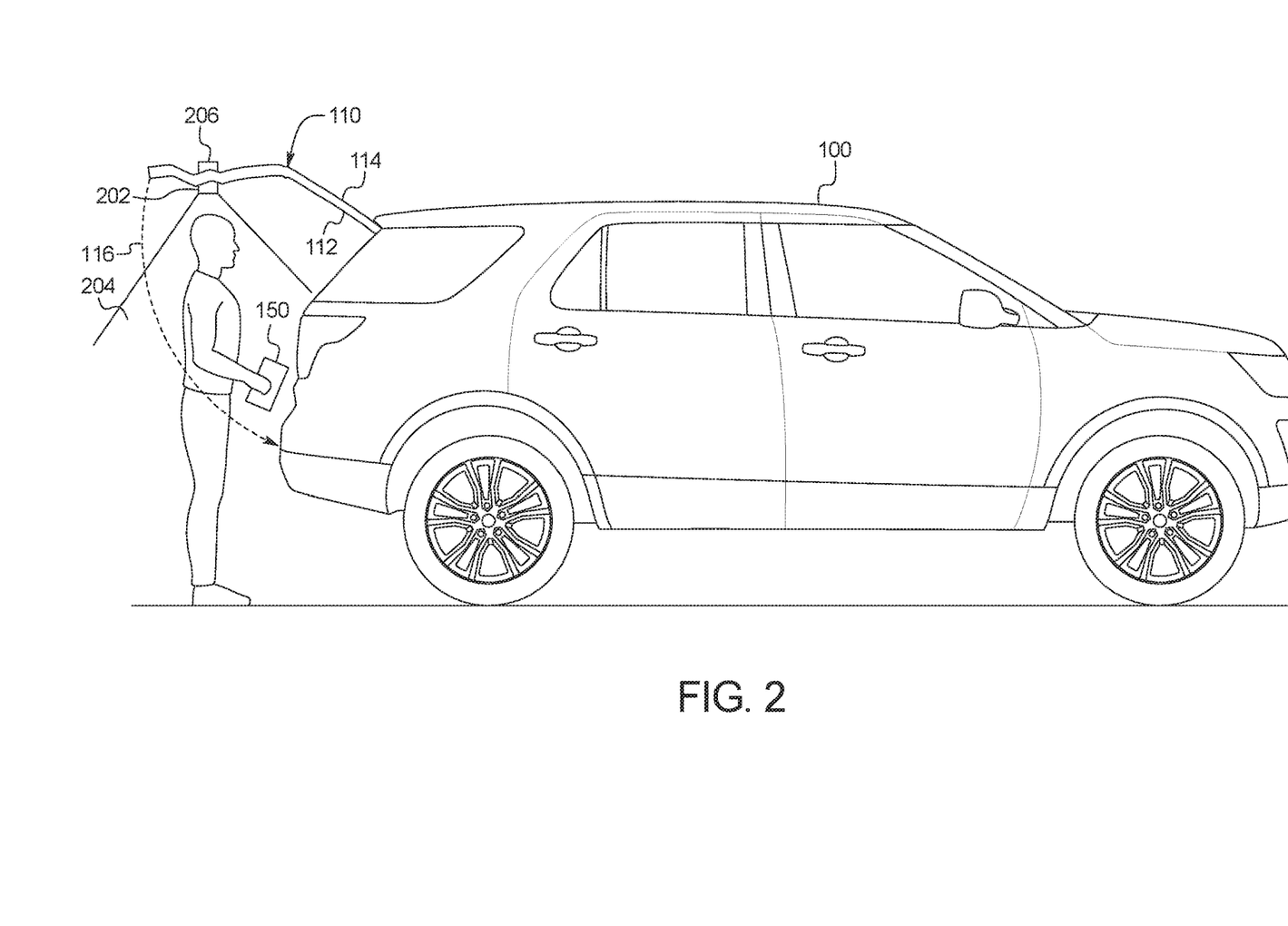
FIG. 2 illustrates the liftgate of FIG. 1 including a camera and a user within a closing path of the liftgate.

FIG. 2 illustrates an example of the liftgate 110 of FIG. 1 that includes a camera 202. In this illustrated example, the camera 202 is disposed on the interior surface 112 of the liftgate 110. In some examples, the camera 202 is positioned on the interior surface 112 such that a center of a field-of-view (FOV) 204 of the camera 202 is perpendicular to the interior surface 112. In some examples, the camera 202 moves its lens to alter the center of the FOV 204 of the camera 202. In some examples, the liftgate 110 further includes a rear-view camera 206 disposed on the exterior surface 114. In some examples, the camera 202 and the rear-view camera 206 are integrally connected into a signal electronic packet disposed within the liftgate 110. Alternatively, in some examples, the rear-view camera 206 and the camera 202 are separately packaged and operate independently from each other.

Figure 3A:
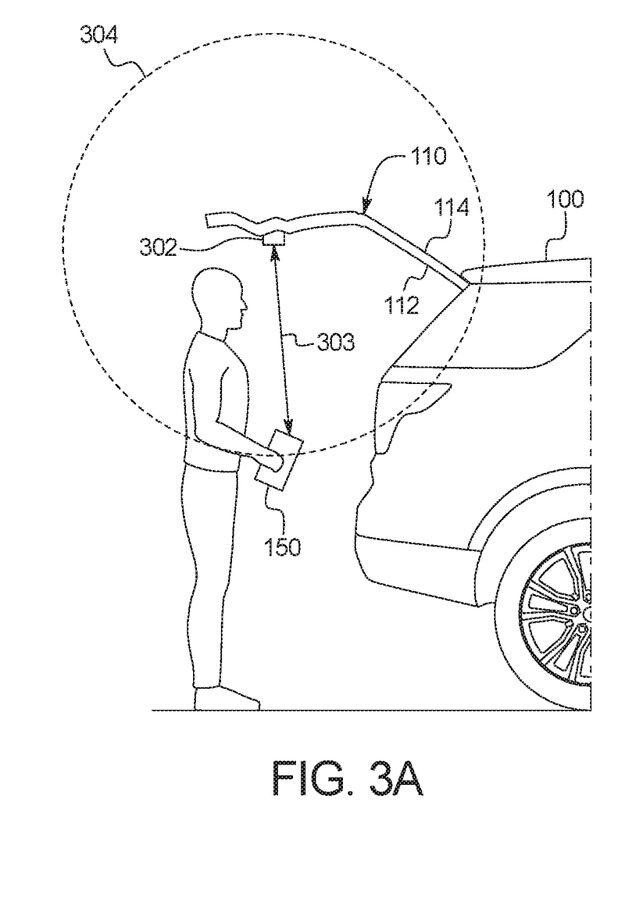
FIG. 3A illustrates the liftgate of FIG. 1 including a sensor and a user's mobile device within a threshold distance from the sensor.

FIG. 3A illustrates the liftgate 110 of FIG. 1 that includes a sensor 302. In the illustrated example, the sensor 302 is attached to the interior surface 112 of the liftgate 110. The sensor 302 detects the proximity of a mobile device relative to the sensor 302. For example, the sensor 302 may be a Bluetooth® Low Energy (BLE) beacon, or a wireless local area network node, etc. The sensor 302 determines the distance of the mobile device 150 relative to the sensor 302 based on the strength of signals communicated between the sensor 302 and the mobile device 150. In some examples, the sensors 302 may include infrared sensors and/or any other sensors that facilitate measuring distances.

Figure 3B:
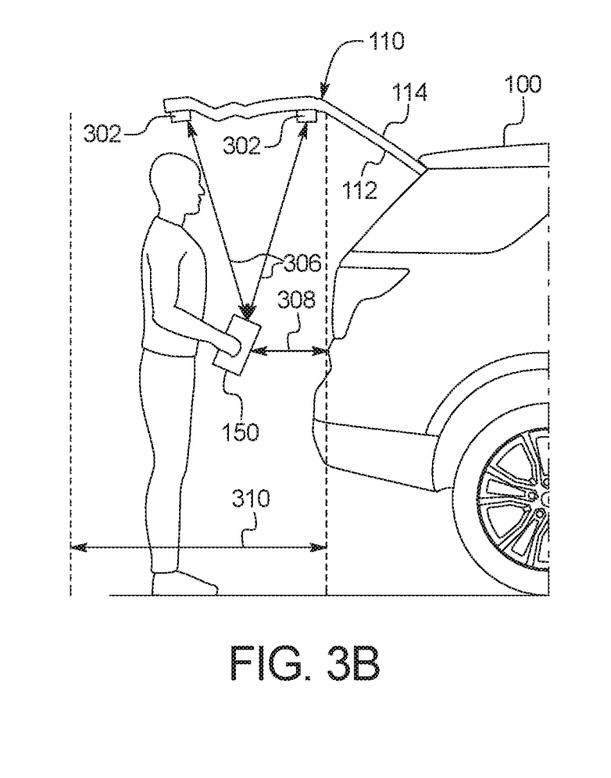
FIG. 3B illustrates the liftgate of FIG. 1 including a plurality of sensors and a user's mobile device within a critical zone.

FIG. 3B illustrates the liftgate 110 of FIG. 1 that includes more than one sensor 302. In this illustrate example, each of the sensors 302 is disposed on the interior surface 112 of the liftgate 110. Based on signal strength measurements between the mobile device 160 and the sensors 302 and the fixed distance between the sensors 302, the sensors 302 determine a relative location of the mobile device 150 using triangulation or trilateration.

Returning to FIG. 1, the OBCP 120 is communicatively coupled to the BCM 140 and the warning system 130. The OBCP 120 wirelessly pairs the mobile device 150 to commutatively couple the mobile device 150 to the vehicle 100. In some examples, the OBCP 120 facilitates commutatively coupling multiple mobile devices with the vehicle 100. In some examples, the OBCP 120 also includes hardware (e.g., processors, memory, storage, antenna, etc.) and software to control wireless network interfaces. The OBCP 120 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Bluetooth® or Bluetooth® Low Energy (BLE); local area wireless network (including IEEE 802.11 a/b/g/n/ac or others), dedicated short range communication (DSRC), and Wireless Gigabit (IEEE 802.11ad), etc.) to directly (via a personal area network connection or a wireless area network connection) or indirectly (e.g., via a cellular connection) communicatively couple to the mobile device The warning system 130 is communicatively coupled to the BCM 140. The warning system 130 generates a warning in response to receiving a command from the BCM 140. For example, the warning system 130 may include one or more speakers for generating an audible warning. In alternative examples, the warning system 130 may transmit a warning message via the OBCP 120 to the user's mobile device 150. In some example, the warning system 130 includes one or more display devices for visually displaying a warning.

The BCM 140 includes a liftgate controller 142 that controls the motive functions of the liftgate 110, such as opening and closing the liftgate 110. The liftgate controller 142 initiates a liftgate closing operation in response to receiving a liftgate closing command. For example, the liftgate controller 142 may receive the closing command from an operator via an interface provided on a center console of a vehicle infotainment system (not shown). In some examples, the liftgate controller 142 receives that closing command by the operator via the mobile device 150. The liftgate controller detects whether an object is within a closing path of the liftgate 110 by using a camera and/or sensors. Such feature will be described in greater detail below with reference to FIGS. 2, 3A, and 3B.

Returning to FIG. 2, the liftgate controller 142 activates the camera 202 when the liftgate closing command is received. The liftgate controller 142 receives images captured by the camera 202 of an area that includes a closing path 116 of the liftgate 110. The liftgate controller 142 analyzes the captured images to determines whether an object exists within the closing path 116 of the liftgate 110. For example, the liftgate controller 142 may compare each of the captured images to one or more images of the closing path 116 stored in memory and detect whether an object has been introduced by at least one of the captured images. When there is no object within the closing path 116 of the liftgate 110, the liftgate 112 controller begins to close the liftgate 110 at a first speed. As the liftgate 110 closes, the liftgate controller 142 continuously monitors images from the camera 202 to determine whether an object enters the closing path 116 of the liftgate 110. When an object is within the closing path 116 of the liftgate 110, the liftgate controller 142 determines whether the detected object is a person. For example, the liftgate controller 142 may compare the captured images to images of people in a lookup table stored in memory to determine whether the detected object is a person. In an alternative example, the liftgate controller 142 may include a facial recognition system for determining whether the detected object is a person. When the detected object is a person, the liftgate controller 142 stops closing the liftgate 110 or opens the liftgate. The liftgate controller 142 provides an audio and/or visual warning to the operator via the warning system 130. The liftgate controller 142 sends a prompt, via the OBCP 120, to the user's mobile device 150 to confirm whether the user wishes the liftgate to continue to close. When the user indicates that the liftgate is to resume closing, the liftgate controller 142 closes the liftgate 110 at a second speed that is slower than the first speed. The liftgate controller 142 continues to monitor, via the camera 202, for objects within the closing path 116 as the liftgate 110 resumes closing.

When the detected object is not a person, the liftgate controller 142 further determines whether the detected object is in motion. For example, the liftgate controller 142 may compare the most recently captured image to one or more previously captured images to determine a change in position indicative of the detected object being in motion. When the detected object is in motion, the liftgate controller 142 estimates (1) the trajectory and speed at which the detected object is moving, (2) the angular speed of the liftgate 110 based on the current setting of liftgate 110, and (3) the angle at which the liftgate 110 is hinged to the entrance to the cargo compartment. Based on the calculation, the liftgate controller 142 estimate a position at which the liftgate 110 will contact the detected object. When the liftgate controller 142 determines that the liftgate 110 will not contact the detected object, the liftgate controller 142 closes the liftgate 110 at the second speed. Additionally, the liftgate controller 142 continues to monitor for additional objects within the closing path 116. When the liftgate controller 142 determines that the detected object is not in motion, or when the liftgate controller 142 determines that the liftgate 110 will contact the detected moving object, the liftgate controller 142 stops closing the liftgate 110 or opens the liftgate 110. Additionally, the liftgate controller 142 provides an audio and/or visual wanting via the warning system 130. The liftgate controller 142 prompts the user via the user's mobile device 150 whether the user wishes to continue closing the liftgate 110. When the user indicates to continue to close the liftgate 110, the liftgate controller 142 closes the liftgate 110 to close at the second speed. The liftgate controller 142 then continues to monitor for additional objects within the closing path 116 of the liftgate 110.

Returning to FIG. 3A, liftgate controller 142 activates the sensor 302 in response to receiving the liftgate closing command from an authorized mobile device (e.g., a mobile device 150 that is paired with the OBCP). In the illustrated example, one of the sensors 302 is located on a surface of the liftgate 110 that faces the interior of the vehicle 100 when the liftgate is closed and another one of the sensors 302 is located on a rear-facing location on the vehicle 100 when the liftgate 110 is open. The liftgate controller 142 determines, via the sensor 302, the distance of the user's mobile device 150 relative to the sensor 302. When the user's mobile device 150 and the sensor 302 are within a threshold distance 303 (e.g., 1 meter), the liftgate controller 142 stops closing the liftgate 110. The liftgate controller 142 dynamically changes the threshold distance 303 as the liftgate 110 changes its position. For example, the threshold distance 303 may be 1 meter when the liftgate 110 is fully opened, and the threshold distance 303 may be 0.5 meter when the liftgate 110 is half-opened. In some examples, the threshold distance 303 changes based on the size of the user. In such example, the size of the user may be input via the interface or the user's mobile device 150 prior to operating the liftgate 110. When the liftgate controller 142 determines that the the user's mobile device 150 is within the threshold distance 303 of the sensor 302, the liftgate controller 142 stops closing the liftgate 110 or opens the liftgate 110. Additionally, the liftgate controller 142 provides an audio and/or visual wanting via the warning system 130. The liftgate controller 142 prompts the user via the user's mobile device 150 whether the user wishes to continue closing the liftgate 110. When the user indicates to continue to close the liftgate 110, the liftgate controller 142 closes the liftgate 110 to close at the second speed. The liftgate controller 142 then continues to monitor for additional objects within the closing path 116 of the liftgate 110. In the example illustrated in FIG. 3A, the threshold distance 303 defines a circular area 304 encompassing a zone in which detecting a presence of the user's mobile device 150 triggers the liftgate controller 142 to act as described above.

Returning to FIG. 3B, the liftgate controller 142 activates the multiple sensors 302 when the liftgate closing command is received. The multiple sensors 302 are located on the interior surface 112. The liftgate controller 142, via the sensors 302, determines a first distance 306 based on measurements indicative of the proximity of the user's mobile device 150 relative to the sensors 302 (e.g., based on signal strength measurements of signals received from the mobile device 150, etc.). In some example, the liftgate controller 142 calculates the first distance 306 using a distance estimates based on signal strength measurements measured by each of the sensors 302. The liftgate controller 142 determines a second distance 308 by measuring the distance between the mobile device 150 and the rear end of the vehicle 100. The liftgate controller 142 establishes a critical zone. Using the first and second distances, the liftgate controller 142 determines whether the user's mobile device 150 is in the critical zone 310. In this illustrated example, the critical zone 310 is encompasses a fixed area relative to the rear end of the vehicle 100. The liftgate controller 142 defines the critical zone 310 so that it has the same dimensions and is at a same position relative to the vehicle 100 even as the sensors 302 on the liftgate 110 are moving as the liftgate 110 closes. When the liftgate controller 142 determines that the user's mobile device 150 is within the critical zone 310, the liftgate controller 142 stops closing the liftgate 110 or opens the liftgate 110.

Figure 4:
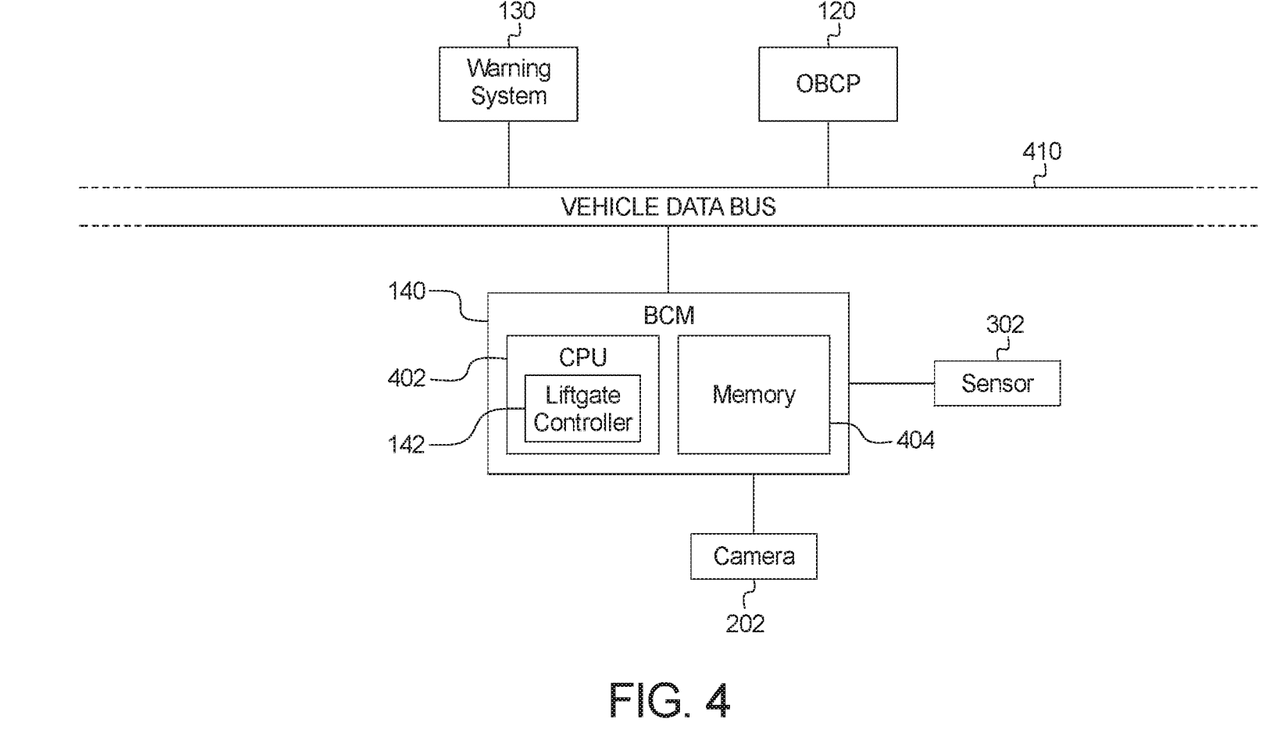
FIG. 4 illustrates a block diagram of electronic components of the vehicles of FIGS. 1, 2, 3A, and 3B.

FIG. 4 is a block diagram of electronic components of the vehicle 100 of FIG. 1. In the illustrate example, the electronic components include the BCM 140, the warning system 130, the OBCP 120, the camera 202, the sensor 302, and the vehicle data bus 410.

In the illustrated example, the BCM 140 includes a processor or controller 402 and memory 404. In the illustrated example, the BCM 140 is structured to include the liftgate controller 142. Alternatively, in some examples, the liftgate controller 142 is incorporated into another electronic control unit (ECU) (e.g., a dedicated ECU for the liftgate 110, etc.) with its own processor and memory (not shown). The processor or controller 402 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 404 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 404 includes multiple kinds of memory, particularly volatile memory and non-volatile memory.

The memory 404 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 404, the computer readable medium, and/or within the processor 402 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 410 communicatively couples BCM 140, OBCP 120, and the warning system. In some examples, the vehicle data bus 410 includes one or more data buses. The vehicle data bus 410 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 5:
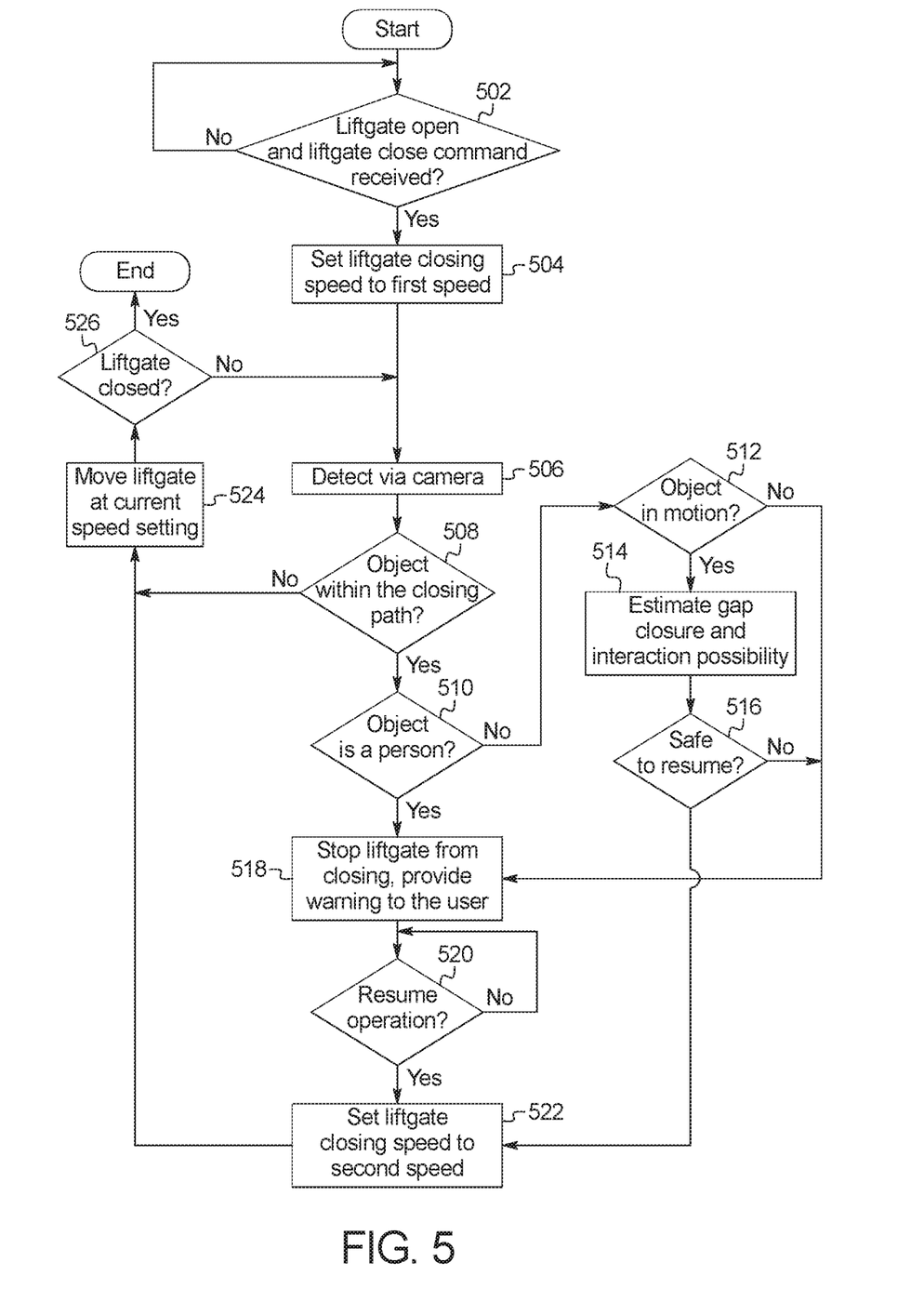
FIG. 5 is a flowchart for performing a liftgate closing operation using the camera of FIG. 2.

FIG. 5 is a flowchart of a method for performing a liftgate closing operation using the camera 202 of FIG. 2, which may be implemented by the electronic components of FIG. 4.

At block 502, the liftgate controller 142 determines whether the liftgate 110 is open while a command for closing the liftgate 110 is received. When the liftgate 110 is opened and the command is received, the method continues to block 504. When the liftgate 110 is not open or the command has not been received, the method returns to block 502.

At block 504, the liftgate controller 142 sets a closing speed for the liftgate 110 to the first speed.

At block 506, the liftgate controller 142 activates the camera 202 to capture images of the closing path 116 of the liftgate 110.

At block 508, the liftgate controller 142 analyzes the captured images to determine whether there is an object within the closing path 116 of the liftgate 110. When an object is within the closing path 116, the method continues to block 510. When an object is not within the closing path 116, the method continues to block 524.

At block 510, the liftgate controller 142 determines whether the detected object is a person. For example, the liftgate controller 142 compares the detected object to images in a lookup table stored in memory to determine whether the object is a person. When the detected object is a person, the method continues to block 518. When the detected object is not a person, the method continues to block 512.

At block 512, the liftgate controller 142 determines whether the detected object is in motion. For example, the liftgate controller 142 may compare the most recently captured image to one or more previously captured images to determine whether the detected object is in motion. When the detected object is in motion, the method continues to block 514. When the detected object is stationary, the method continues to block 518.

At block 514, (1) estimates the trajectory and speed at which the detected object is moving; (2) calculates the angular speed of the liftgate 110 based on the current setting of liftgate 110; (3) calculates the angle at which the liftgate 110 is hinged to the entrance to the cargo compartment; and (4) estimates a potential interaction between the detected object and the liftgate 110 based the calculated trajectory/speed of the detected object and the calculated angular speed and the angle of the liftgate 110.

At block 516, the liftgate controller 142 determines whether an interaction between the liftgate 110 and the detected object would occur based on the estimation. When the liftgate controller 142 determines that an interaction would occur, the method continue to block 518. When the liftgate controller 142 determines that no interaction would occur, the method continues to block 522.

At block 518, the liftgate controller 142 stops the liftgate 110 from closing and causes the warning system 130 to provide the warning to the user.

At block 520, the liftgate controller 142 further causes, via the warning system 130 and the OBCP 120, the user's mobile device 150 to prompt the user as to whether the user wishes to continue the liftgate closing operation. The liftgate controller 142 determines whether an input has been received from the user's mobile device 150. When the input indicates the user wishes to resume the liftgate closing operation, the method continues to block 522. When the input indicates that the user does not wish to resume the liftgate closing operation, the method returns to block 520.

At block 522, the liftgate controller 142 sets the liftgate 110 closing speed to the second speed.

At block 524, the liftgate controller 142 causes the liftgate 110 to move at a current speed setting.

At block 526, the liftgate 110 determines whether the liftgate 110 is closed. When the liftgate 110 is closed, the method terminates. When the liftgate 110 is not closed, the method returns to step 506.

Figure 6:
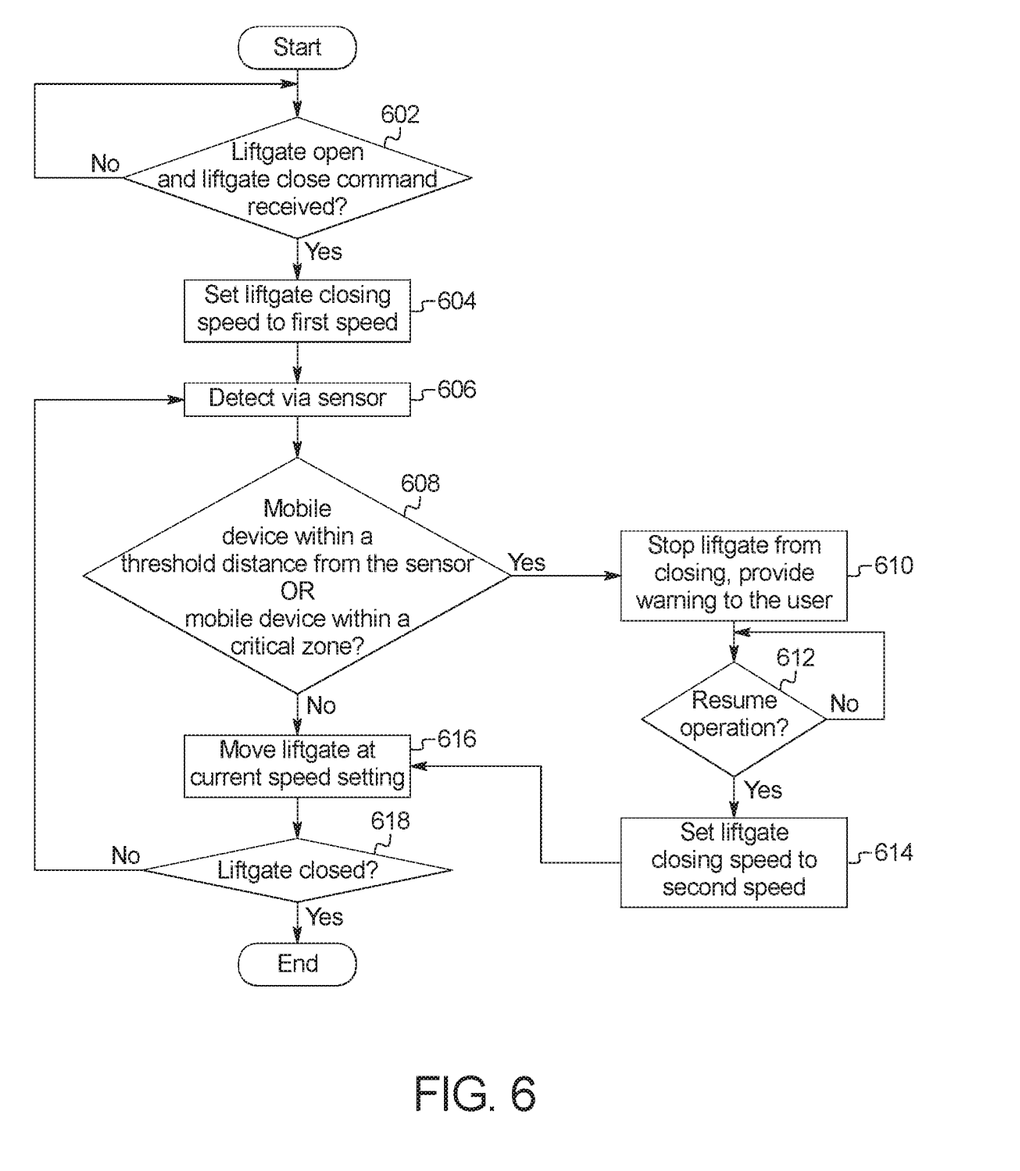
FIG. 6 is a flowchart for performing a liftgate closing operation using the one or more sensors of FIGS. 3A and 3B.

FIG. 6 is a flowchart of a method for performing a liftgate closing operation using the one or more sensor 302 of FIGS. 3A and 3B, which may be implemented by the electronic components of FIG. 4.

At block 602, the liftgate controller 142 determines whether the liftgate 110 is opened and a command for closing the liftgate 110 has been received. When the liftgate 110 is opened and the command is received, the liftgate controller 142 initiates the liftgate closing operation, and the method continues to step 604. When the liftgate 110 is not opened or the command has not been received, the method returns to block 602.

At block 604, the liftgate controller 142 sets the liftgate 110 closing speed to the first speed.

At block 606, the liftgate controller 142 activates the one or more sensor 302.

At block 608, the liftgate controller 142 detects, via the one or more sensor 302, whether the user's mobile device 150 is within a threshold distance 303 from the a sensor 302. In some examples, when a plurality of sensors 302 are used to detect the presence of the user's mobile device 150, the liftgate controller 142 detects, via the plurality of sensors 302, whether the user's mobile device 150 is within the critical zone 310. When the user's mobile device 150 is within the threshold distance 303 or the critical zone 310, the method continues to step 610. When the user's mobile device 150 is not within the threshold distance 303 or the critical zone 310, the method continues to step 612.

At block 610, the liftgate controller 142 stops the liftgate 110 from closing and causes the warning system 130 to provide the warning to the user.

At block 612, the liftgate controller 142 further causes, via the warning system 130 and the OBCP 120, the user's mobile device 150 to prompt the user as to whether the user wishes to continue the liftgate closing operation. The liftgate controller 142 determines whether an input has been received from the user's mobile device 150. When the input indicates the user wishes to resume the liftgate closing operation, the method continues to block 614. When the input indicates that the user does not wish to resume the liftgate closing operation, the method returns to block 612.

At block 614, the liftgate controller 142 sets the liftgate 110 closing speed to the second speed.

At block 616, the liftgate controller 142 causes the liftgate 110 to close at the current speed setting.

At block 618, the liftgate 110 determines whether the liftgate 110 is closed. When the liftgate 110 is closed, the method terminates. When the liftgate 110 is not closed, the method returns to step 606.

The flowcharts of FIGS. 5 and 6 are representative of machine readable instructions stored in memory (such as the memory of FIG. 4) that comprise one or more programs that, when executed by a processor (such as the processor of), cause the vehicle 100 to implement the example liftgate controller 142 and/or, more generally, the example liftgate controller 142 of FIGS. 1 and 4. Further, although the example program(s) is/are described with reference to the flowcharts illustrated in FIGS. 5 and 6, many other methods of implementing the example liftgate controller 142 and/or, more generally, the example liftgate controller 142 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensor 302. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a liftgate comprising a surface facing an interior of the vehicle when the liftgate is closed;
   a camera disposed on the surface, the camera comprising a lens; and
   a processor configured to:
      initiate a liftgate closing operation;
      capture one or more images of an area that includes a closing path of the liftgate;

analyze the one or more images to detect a person within the closing path of the liftgate;
subsequent to detecting the person within the closing path, stopping, via the processor, the liftgate closing operation;
providing an alert to a mobile device of the person; and
responsive to receiving an input from the mobile device:
resuming, via the processor, the liftgate closing operation; and
presenting, via the mobile device, an indication of a speed at which the liftgate closes.

2. The vehicle of claim 1, wherein analyzing the one or more images
to detect a person further comprises compare at least one image captured by the camera with a lookup table stored in memory.

3. The vehicle of claim 1, wherein the camera is disposed on the
surface such that the center of a field-of-view of the camera is perpendicular to a direction at which the surface is extending.

4. The vehicle of claim 1, further comprising at least one speaker,
wherein the processor causes the at least one speaker to issue a warning based on detecting, via the camera, the person within the closing path of the liftgate.

5. The vehicle of claim 1, wherein the liftgate further comprises an
exterior surface opposing the surface, wherein the vehicle further comprises a rear-view camera disposed on the exterior surface, and wherein the rear-view camera and the camera are integrally connected to each other.

6. A vehicle comprising:
a liftgate comprising a surface facing an interior of the vehicle when the liftgate is closed;
a first sensor disposed on the surface; and
a processor to:
define, via at least the first sensor, a critical zone at a rear end of the vehicle, wherein the critical zone is stationary while the liftgate is moving;
determine that a mobile device is located within the critical zone;
determine, based on the determination that the mobile device is located within the critical zone, that a person is located within the critical zone;
provide an alert to the mobile device;
control the liftgate during a liftgate closing operation in response to the first sensor detecting the person within the critical zone; and
presenting, via the mobile device, an indication of a speed at which the liftgate closes.

7. The vehicle of claim 6, further comprising at least one speaker,
wherein the processor causes the at least one speaker to issue a warning when the first sensor detects that the mobile device is within the critical zone.

8. The vehicle of claim 6, wherein the mobile device is a smartphone.

9. The vehicle of claim 6, wherein the processor is further to:
determine that a person is within the critical zone by detecting the mobile device within the critical zone.

10. A method of operating a vehicle, comprising:
initiating, via a processor, a liftgate closing operation;
capturing one or more images of an area that includes a closing path of a liftgate of the vehicle, the capturing comprising moving a lens of a camera to alter a center of a field of view of the camera;
detecting an object within the closing path of a liftgate by analyzing the one or more images;
responsive to the object being in motion, estimating, via the processor, a trajectory of the object;
providing, based on the trajectory of the object, an alert to a mobile device of a user;
controlling, based on the trajectory of the object, a speed at which the liftgate closes; and
presenting, via the mobile device, an indication of a speed at which the liftgate closes.

11. The method of claim 10, further comprising:
determining, via the processor, whether the object is a person.

12. The method of claim 10, wherein the controlling further comprises:
controlling the liftgate based on a current angle at which the liftgate is positioned with respect to an upper edge of a cargo area within the vehicle.

13. The method of claim 10, further comprising:
prior to the detecting, communicatively pairing, via the processor, a mobile device to the vehicle; and
responsive to the detecting, causing, via the processor, a warning to be transmitted to the mobile device.

14. The vehicle of claim 9, wherein the processor is further to:
determine a distance between the mobile device and the first sensor; and
stop closing the liftgate when the mobile device is within a threshold distance of the first sensor.

15. The vehicle of claim 14, wherein the processor is further to:
dynamically change the critical zone as the liftgate closes.

16. The vehicle of claim 15, wherein dynamically changing the Critical zone comprises reducing the threshold distance as the liftgate closes.

* * * * *